United States Patent [19]
Sedlak et al.

[11] Patent Number: 6,059,191
[45] Date of Patent: May 9, 2000

[54] CHIP CARD

[75] Inventors: Holger Sedlak, Egmating; Klaus Oberländer, Augsburg, both of Germany

[73] Assignee: Siemens Aktiengesellschaft, Munich, Germany

[21] Appl. No.: 09/142,753

[22] PCT Filed: Mar. 4, 1997

[86] PCT No.: PCT/DE97/00407

§ 371 Date: Sep. 14, 1998

§ 102(e) Date: Sep. 14, 1998

[87] PCT Pub. No.: WO97/34254

PCT Pub. Date: Sep. 18, 1997

[30] Foreign Application Priority Data

Mar. 14, 1996 [DE] Germany ............... 196 10 070

[51] Int. Cl.[7] .................................................. G06K 19/06
[52] U.S. Cl. ........................ 235/492; 235/380; 235/451
[58] Field of Search ............................ 235/492, 38, 382, 235/382.5; 902/26, 3, 4, 5

[56] References Cited

U.S. PATENT DOCUMENTS

| | | | |
|---|---|---|---|
| 3,699,311 | 10/1972 | Dunbar | 235/482 |
| 5,471,039 | 11/1995 | Irwin, Jr. et al. | 235/441 |
| 5,475,205 | 12/1995 | Behm et al. | 235/451 X |

FOREIGN PATENT DOCUMENTS

| | | |
|---|---|---|
| 0 481 881 | 4/1992 | European Pat. Off. . |
| 2 606 199 | 5/1988 | France . |
| 2621271 C2 | 11/1976 | Germany . |
| 43 28 753 A1 | 3/1994 | Germany . |
| 8903111 | 7/1991 | Netherlands . |

OTHER PUBLICATIONS

Handbuch "Chipkarten", Carl Hanser Verlag, 1995, pp. 208–213. Month Missing.

*Primary Examiner*—Michael G Lee
*Attorney, Agent, or Firm*—Hill & Simpson

[57] ABSTRACT

The invention relates to a chip card having a card body (2) and a semiconductor chip (3) which is accommodated within the card body (2) and on which a control circuit (7) and a semiconductor memory device, which is electrically coupled to the control circuit (7), are constructed in an integrated manner, which control circuit (7) is supplied with a supply voltage generated by a voltage supply circuit (12) and with a clock generated by a clock supply circuit (13), which is arranged separately from the control circuit (6). The control circuit (7) of the semiconductor chip (3), which is accommodated within the card body (2), is assigned a sensor circuit (14) which detects a deviation of the allowed operating state of the control circuit (7) and, if a disallowed operating state of the control circuit is present, generates a triggering signal which is fed to a triggering circuit (18), which is connected downstream of the sensor circuit (14), is assigned to the semiconductor memory device and, as a reaction to the triggering signal, controls an at least partial erasure of the data content of memory cells of the semiconductor memory device.

8 Claims, 1 Drawing Sheet

CHIP CARD

BACKGROUND OF THE INVENTION

1. Field of the Invention

The invention relates to a chip card having a card body and a semiconductor chip which is accommodated within the card body and on which a control circuit and a semiconductor memory device, which is electrically coupled to the control circuit, are constructed in an integrated manner, which control circuit is supplied with a supply voltage generated by a voltage supply circuit and with a clock generated by a clock supply circuit, which is arranged separately from the control circuit, the supply voltage having an operating voltage value lying within predetermined operating voltage limits, and the supply clock having an operating clock value lying within predetermined operating clock limits.

2. Description of the Related Art

The possible applications of chip cards, which are generally constructed in the check card format, have become extremely diverse, because of a high functional flexibility, and are increasing further with the rising computing power and memory capacity of the available integrated circuits. In addition to the currently typical fields of application of such chip cards in the form of health insurance cards, flex-time registration cards, telephone cards, the future will yield, in particular, applications in electronic payment transactions, in computer-controlled access monitoring, in protected data storage and the like. When microcontrollers are used on chip cards, it is necessary in most cases to observe very high security requirements, in order effectively to prevent unauthorized access to confidential data about the chip card holder or manipulation of amounts of money. In the previously known chip cards, protective elements are therefore incorporated, which can be subdivided, in terms of the mode of operation, into passive and active protective mechanisms, and which are described, for example, in the handbook having the title "Chipkarten" [chip cards], Carl Hanser Verlag, 1995, pages 208–213.

Passive protective mechanisms are essentially based directly on the technology of semiconductor manufacture. For example, in order to check the chips during the semiconductor production and in order to execute the internal test programs, all microcontrollers have a so-called test mode, in which the semiconductor circuits can be tested still on the wafer or in the module at the manufacturer's. This test mode allows modes of access to the memory which are strictly forbidden later, with the result that the changeover from the test mode into the user mode must be tendered irreversible. This is generally effected using polysilicon fuses on the chip. Furthermore, it is known to arrange the internal buses on the chip, which connect the processor to three different memory types ROM, EEPROM and RAM, are thus not led to the outside and with which thereafter contact cannot be made even using very complicated methods, in a confused and many times mutually interchanged position via encoded arrangements of the individual bus lines. There is therefore no possibility for an unauthorized user to listen in to, or to influence, the address, data or control bus of the microcontroller and thereby to read out memory contents. Furthermore, by accommodating the semiconductor memory not in the uppermost and thus most easily accessible layers but in the lower silicon layers, it is made impossible or more difficult to read out the content of a read-only memory bit by bit using an optical microscope. A further risk is represented by the analysis of electrical potentials on the chip during operation. Given a sufficiently high sampling frequency, there is the possibility of measuring charge potentials, that is to say voltages, on very small crystal regions and in this way of drawing conclusions about the data contents of the semiconductor memory of the random access type (RAM) during operation, and hence of obtaining access to confidential data about the chip card holder. This can be prevented in a certain way by means of an additional metallization layer over the corresponding memory cells. If, for example, this metal layer is removed using a chemical method, the chip is no longer serviceable, since the metallization layer is needed as electric voltage feed for the correct functioning of the chip.

Furthermore, active protective mechanisms in chip cards are known, which are intended to prevent unauthorized access to data contents. For example, a sensor circuit may be provided which, via a resistance or capacitance measurement, establishes whether the passivation layer which is applied to the silicon chip to prevent oxidation on the chip surface is still present, this layer having to be removed when manipulations are undertaken on the chip. If the passivation layer is no longer present or is damaged, either an interrupt in the chip software is triggered or the entire chip is switched off by the hardware, with the result that all dynamic analyses are reliably prevented. Furthermore, it is known to provide on the chip card microcontroller a voltage monitoring circuit which ensures a defined switching off of the module if the operating voltage exceeds or falls below the upper or lower limits, respectively. In this way, the software receives the safeguard that operation in the limit ranges, in which the chip is no longer completely serviceable, is impossible. A further known sensor, which is partly based on voltage detection, is constituted by the so-called power-on detection. This detection, likewise present in the chip, of a power-on state independently of the reset signal ensures that the chip is always set in a defined range when switched on. Furthermore, it is known for a functional subassembly for underfrequency detection to be constructed on the chip in an integrated manner. This prevents the applied clock being slowed down in an inadmissible way. The clock supply to the chip card generally runs externally, so that the internal computing speed is determined completely from the outside. There would thus, in theory, be the possibility of driving the microcontroller from the outside in single-step operation. This would lead to possible unauthorized analyses, primarily in the measurement of current consumptions and electric potentials on the chip.

The common feature of all the protective measures which have been previously disclosed for preventing unauthorized access to confidential data contents in chip cards is that, following triggering of the relevant protective measure, the chip card as a whole is no longer serviceable.

SUMMARY OF THE INVENTION

The invention is based on the object of making available an active protective device for a chip card of the generic type, or of improving such a device to the extent that the risk of unauthorized access to data contents of memory cells of the semiconductor memory of the random access type which is accommodated within the chip card can effectively be ruled out, at the same time the circuit components of the chip card which are not involved in the unauthorized access remaining serviceable.

This object is achieved by means of a chip card according to claim 1.

According to the invention, provision is made that the control circuit of the semiconductor chip, which is accommodated within the card body, is assigned a sensor circuit which detects a deviation of the allowed operating state of the control circuit and/or of further circuit components of the semiconductor chip and, if a disallowed operating state is present, generates a triggering signal which is fed to a triggering circuit, which is connected downstream of the sensor circuit, is assigned to the semiconductor memory device and, as a reaction to the triggering signal, controls an at least partial erasure of the data content of the semiconductor memory device. The invention thus consists essentially, in the event of any deviation of the allowed operating state of the control circuit accommodated in the chip card and/or of further circuit components, in automatically controlling an immediate erasure of security-related or personal data contents. A deviation from the allowed operating state of the control circuit is, for example, brought about in the case of unauthorized access or unauthorized manipulation of circuit components of the chip card, for example during the attempt to read out confidential data by means of unauthorized operations. As a result of the deviation from the allowed operating state, such a manipulation attempt is automatically detected and the automatic erasure, in particular, of all confidential data contents is triggered. Such data contents are stored, for example, in a semiconductor memory of the random access type which is electrically coupled to the control circuit, but, furthermore, also, for example, in a memory register assigned to the control circuit, for example a so-called special function register, or occasionally stored in an accumulator. The triggering signal which is generated by the sensor circuit in the event of a deviation from the allowed operating state thus controls not only the erasure of the relevant data contents of the semiconductor memory of the random access type (RAM), but also the erasure of data contents of all further memory or register devices in which, at least occasionally, such data are stored and from which conclusions about confidential information can be drawn.

A significant advantage of the invention lies in the fact that, in the event of the occurrence of an disallowed operating state, the serviceability of the circuit components which are not affected by the manipulation attempt, in particular the control circuit itself, remain in operation unchanged. In this way, following the occurrence of a manipulation attempt, data signals can still effectively be processed. For example, a transmission of data to a terminal which is connected to the chip card can take place, and a corresponding blocking of the chip card, specifying the associated personal data, can be arranged.

In an arrangement which is particularly simple to realize, provision may be made that, following the detection of the disallowed operating state, a complete erasure of data contents is carried out automatically. This can preferably be brought about by outputting a reset signal to all the relevant memory or register devices of the semiconductor memory device.

In a preferred embodiment of the invention, provision is made that the sensor circuit is assigned to the clock supply and/or the voltage supply of the control circuit and detects a deviation of the supply voltage from the operating voltage and/or a deviation of the supply clock from the operating clock and, if a deviation of the operating voltage and/or of the operating clock is present, generates a triggering signal which is fed to a triggering circuit, which is connected downstream of the sensor circuit, is assigned to the semiconductor memory device and, as a reaction to the triggering signal, controls an at least partial erasure of the data content of the semiconductor memory device.

In particular, the semiconductor memory of the random access type (RAM) which is provided in the chip card and is used for the occasional storage of personal data represents a certain weak point of the microcontroller which is constructed on the semiconductor chip, since its memory cells contain confidential data contents in an ordered form, which in the case of unauthorized access, can be read out by measures which can be carried out relatively easily. By means of the invention, in the event of an unauthorized read-out attempt of the data contents via operating voltage or frequency manipulations, an immediate erasure of the memory cells is caused automatically. Through this measure, unauthorized reading-out of the semiconductor memory, in which confidential data contents or encoding data are occasionally deposited during operation, is at least made considerably more difficult. It is thus in particular no longer possible to bring the semiconductor chip into an disallowed operating state, in order subsequently quietly to read out "quasi-statically" the data contents which the semiconductor memory holds, as long as the operating voltage is still switched on.

Following the principle of the invention, provision may be made that the sensor circuit has a voltage detector circuit which detects when the supply voltage exceeds or falls below the predetermined upper or lower limit values, respectively, of the operating voltage. Furthermore, provision may be made that the sensor circuit has a frequency detector circuit which detects when the supply clock exceeds or falls below the upper or lower limit values, respectively, of the operating clock.

In a preferred embodiment of the invention, provision may be made that, for the purpose of erasing the data contents of all the memory cells of the semiconductor memory of the random access type, the triggering circuit, which is connected downstream of the sensor circuit, outputs a reset signal to the semiconductor memory. Here, provision may in particular be made that the control of the at least partial erasure of the data content of memory cells of the semiconductor memory of the random access type, by means of the triggering circuit connected downstream of the sensor circuit, is carried out independently of the clock supply assigned to the control circuit. Here, in all four conceivable cases in which the sensor circuit generates the triggering signal, an erasure of the entire semiconductor memory of the random access type is caused, which takes place asynchronously independently of the application of the clock to the control circuit, in order to ensure that the sensor circuit and triggering circuit function properly even when the clock is totally switched off.

BRIEF DESCRIPTION OF THE DRAWINGS

Further advantages, features and expedient points of the invention emerge from the following description of an exemplary embodiment, using the drawing, in which.

DETAILED DESCRIPTION OF THE PREFERRED EMBODIMENTS

Figure 1:
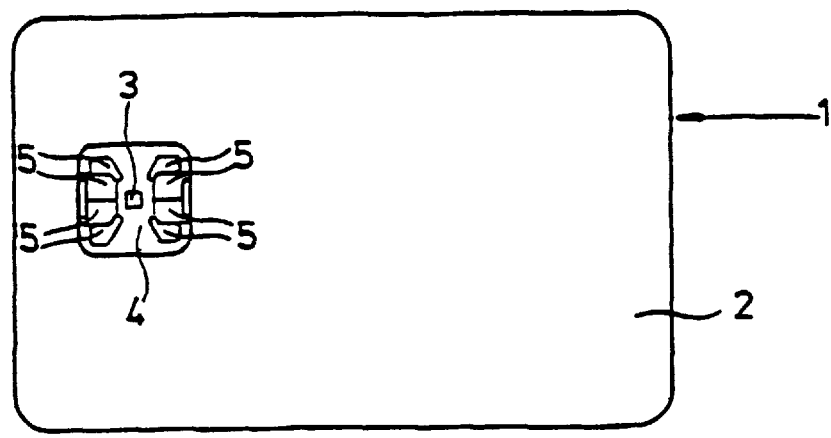
FIG. 1 shows a schematic plan view of a chip card.

FIG. 1 shows a chip card 1 having a card body 2 and a semiconductor chip 3 which is accommodated within the card body 2 and is produced as a constituent part of a prefabricated chip module 4, on the surface of which metallic contact elements 5 for the power supply and the data transfer to the outside are arranged. Instead of a chip card having contacts, the chip card according to the invention may also constitute a contactless card.

Figure 2:
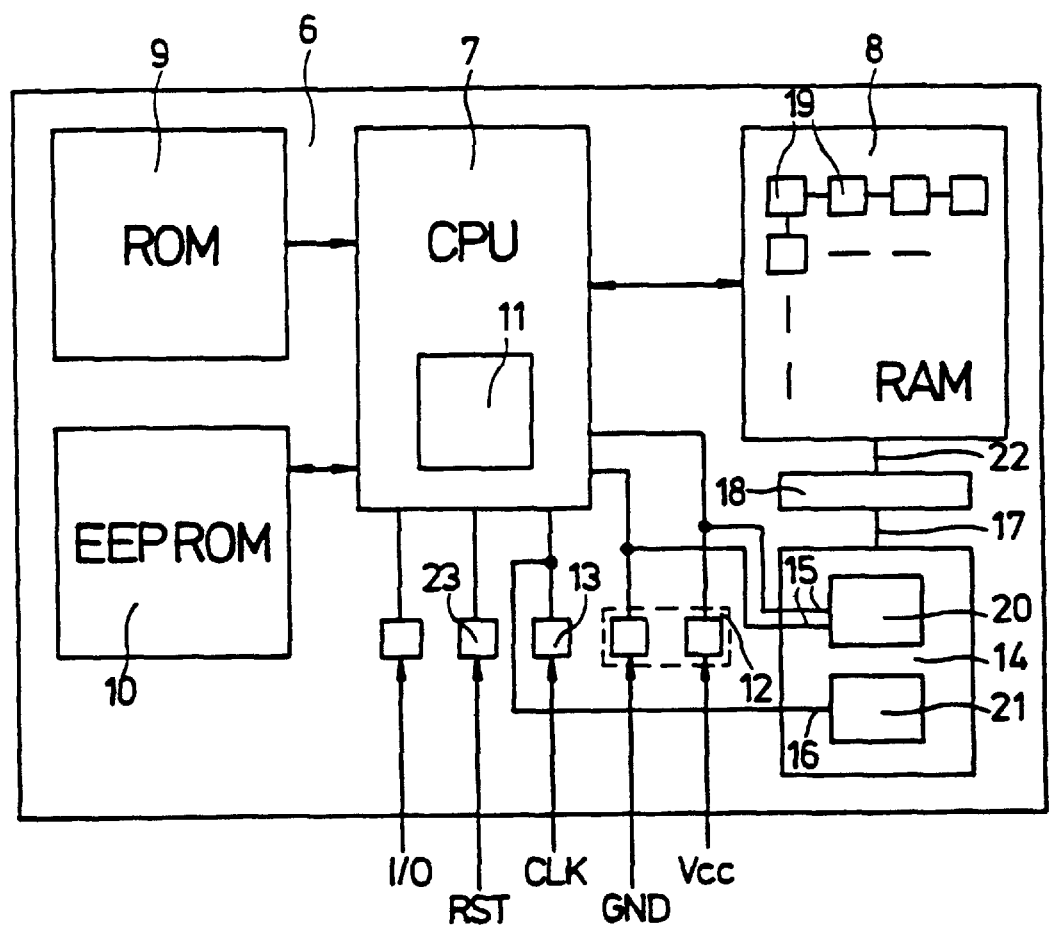
FIG. 2 shows a schematic representation of the electronic circuit components provided on the semiconductor chip which is accommodated in the card body.

Shown in FIG. 2 are the most important functional circuit components of the microcontroller circuit 6 which is constructed on the semiconductor chip 3 and constitutes the central constituent part of the chip card 1. A control circuit or microprocessor circuit 7 and three different semiconductor memories, in particular a semiconductor memory of the random access type (RAM) 8, a read-only memory (ROM) 9, and an electrically programmable and erasable read-only memory (EEPROM) 10 are represented. Located in the ROM memory 9 of the chip card 1 are most of the operating system routines, and diverse test and diagnostic functions. These programs are introduced by the semiconductor manufacturer during the production of the semiconductor chip 3. The EEPROM 10, which is a memory which is technically more complicated than ROM and RAM, is used in the chip card 1 for all the data and programs which are intended to be altered or erased at any point in time. In terms of functionality, an EEPROM corresponds to the hard disk of a personal computer, since data are maintained even without current being supplied, and may be altered as required. The RAM memory 8 constitutes the memory of the chip card 1, in which data can be stored, and altered, as often as required during a session. With regard to the number of possible accesses, the RAM memory 8 is thus not subject to any restrictions as is, for example, the EEPROM memory 10. In order to maintain its data, the RAM memory 8 requires a voltage supply. If the operating voltage is no longer present, or if it fails briefly, the content of the RAM memory 8 is no longer defined. The RAM memory 8 is constructed from a plurality of transistors which are connected such that they function as a bistable flip-flop. The circuit state here represents the memory content of one bit in the RAM memory 8. The RAM memory 8 used in the chip card 1 is of the static type, that is to say the memory content does not have to be periodically refreshed. The RAM memory 8 is therefore also independent of an external clock, in contrast to a dynamic RAM memory. The use of a static RAM memory 8 is moreover also important, since it must be possible to stop the clock supply to chip cards in the so-called sleep mode, which would not be possible in the case of dynamic RAM memories.

The microprocessor 7 which is employed in the chip card 1 constitutes a processor type which is known per se and whose set of commands is geared, for example, to the Intel 8051 architecture and in some cases may be supplemented by further commands. In order to supply a voltage to the circuit components of the microcontroller circuit 6, provision is made of a voltage supply circuit 12 which is fed externally via the connections GND (=ground or earth) and Vcc (=supply voltage) to the contacts 5 of the chip card 1, and which supplies an operating voltage value lying within predetermined operating voltage limits, for example about 3 to 5 V±10%. Furthermore, provision is made of a clock supply circuit 13, schematically represented by the connection Clk (clock), which supplies the microprocessor 7 with the supply clock which is necessary for the chronologically defined sequence of command processing, determines the computing speed of the microcontroller circuit 6 and has an operating clock value lying within predetermined operating clock limits, for example between about 1 to 5 MHz, in future applications about 7.5 MHz to 10 MHz. In relation to the microprocessor circuit 7, the clock supply is predetermined on the basis of the clock supply circuit 13, which is separate therefrom and is represented schematically, so that the internal computing speed is determined completely from the outside. There is therefore, in theory, the possibility of driving the microcontroller circuit 6 from the outside in single-step operation, which could lead to possible unauthorized analyses, primarily in the measurement of current consumptions and electric potentials on the semiconductor chip 3. According to the invention, provision is made of a sensor circuit 14 which is assigned to the clock supply and/or to the voltage supply of the control circuit 7, detects on the input side, via lines 15 and 16, the supply clock directly assigned to the control circuit 7 and/or the supply voltage and, if a deviation of the operating voltage and/or of the operating clock is present, generates a triggering signal which is fed via a line 17 to a triggering circuit 18, which is connected downstream of the sensor circuit 14, is assigned to the semiconductor memory 8 and, in turn, as a reaction to the triggering signal, controls an at least partial erasure of the data content of memory cells 19 of the semiconductor memory 8. In this case, the sensor circuit 14 comprises, on the one hand, a voltage detector circuit 20, which detects when the supply voltage exceeds or falls below the predetermined upper or lower limit values, of the operating voltage, and, on the other hand, a frequency detector circuit 21, which detects when the supply clock exceeds or falls below the upper or lower limit values, respectively, of the operating clock. Preferably, the triggering circuit 18, which is connected via a line 22 to the semiconductor memory 8, generates, as a reaction to the triggering signal supplied by the sensor circuit 14, a reset signal, on the basis of which the data contents of all the memory cells 19 of the semiconductor memory 8 are erased. This reset signal is generated independently of an external RST signal fed via the connection 23 to the contacts 5. At the same time as the erasure of data contents of the memory cells of the semiconductor memory of the random access type, it is also possible, according to the invention, for data contents of a register or accumulator 11, which is assigned to the control circuit and is indicated schematically in FIG. 2, to be erased.

Although other modifications and changes may be suggested by those skilled in the art, it is the intention of the inventors to embody within the patent warranted hereon all changes and modifications as reasonably and properly come within the scope of their contribution to the art.

We claim:

1. A chip card, comprising:

a card body;

a semiconductor chip accommodated within the card body;

a control circuit constructed in an integrated manner on said semiconductor chip and accommodated within said card body;

a semiconductor memory device electrically coupled to the control circuit and constructed in an integrated manner on said semiconductor chip a voltage supply circuit connected to supply a supply voltage to said control circuit;

a clock supply circuit connected to supply a clock signal to said control circuit, said clock supply circuit being arranged separately from the control circuit;

a sensor circuit connected to said control circuit and operable to detect a deviation of an allowed operating state of at least one of the control circuit and further circuit components of the semiconductor chip and, if a disallowed operating state of the at least one control circuit and the further circuit component is present, generates a triggering signal;

a triggering circuit connected downstream of the sensor circuit to receive said triggering signal, said triggering circuit being assigned to the semiconductor memory device and, as a reaction to the triggering signal, controls an at least partial erasure of data content of the semiconductor memory device.

2. A chip card according to claim 1, wherein, for purposes of erasing the data content from all memory cells of the semiconductor memory device, the triggering circuit outputs a reset signal to the semiconductor memory device.

3. A chip card according to claim 1, wherein the sensor circuit is assigned to at least one of the clock supply and the voltage supply of the control circuit and detects a deviation of at least one of the supply voltage from the operating voltage and of the supply clock from the operating clock and, if a deviation of the at least one of the operating voltage and the operating clock is present, generates the triggering signal which is fed to the triggering circuit.

4. A chip card according to claim 1, wherein the sensor circuit includes a voltage detector circuit which detects when the supply voltage exceeds or falls below the predetermined upper or lower limit values, respectively, of an operating voltage.

5. A chip card according to claim 1, wherein the sensor circuit includes a frequency detector circuit which detects when the supply clock exceeds or falls below the predetermined upper or lower limit values, respectively, of an operating clock.

6. A chip card according to claim 1, wherein control of at least partial erasure of the data content of memory cells of the semiconductor memory device, by the triggering circuit, is carried out independently of the clock supply assigned to the control circuit.

7. A chip card according to claim 1, wherein the control circuit includes:

a microprocessor circuit of a microcontroller circuit which is constructed on the semiconductor chip in an integrated manner and, as further functional units, at least one of a read-only semiconductor memory and an electrically erasable semiconductor memory.

8. A chip card according to claim 1, wherein at a same time as erasure of data contents of the memory cells of the semiconductor chip of the random access type, data contents of a register or accumulator assigned to the control circuit are also erased.

* * * * *